US005321774A

United States Patent [19]
Barnard et al.

[11] Patent Number: 5,321,774
[45] Date of Patent: Jun. 14, 1994

[54] POLARIZATION INDEPENDENT TRANSMISSIVE/REFLECTIVE OPTICAL SWITCH

[75] Inventors: Chris Barnard, Orleans; Jacek Chrostowski, Gloucester, both of Canada

[73] Assignee: National Research Council of Canada, Ottawa, Canada

[21] Appl. No.: 99,453

[22] Filed: Jul. 30, 1993

[51] Int. Cl.[5] .......................... G02B 6/26; G02B 6/28
[52] U.S. Cl. ........................................ 385/16; 385/8; 385/11; 385/18; 385/24; 385/36
[58] Field of Search ............... 385/11, 15, 18, 16, 385/27, 28, 8, 9, 22, 23, 24, 37, 36, 2, 5

[56] References Cited

U.S. PATENT DOCUMENTS

| | | | |
|---|---|---|---|
| 4,121,884 | 10/1978 | Greenwood | 385/18 X |
| 4,355,864 | 10/1982 | Soref | 385/18 X |
| 4,384,761 | 5/1983 | Brady et al. | 385/18 X |
| 4,478,494 | 10/1984 | Soref | 385/2 X |
| 4,505,539 | 3/1985 | Auracher et al. | 385/16 X |
| 4,978,189 | 12/1990 | Blonder et al. | 385/16 X |
| 5,037,169 | 8/1991 | Chun | 385/16 |
| 5,191,467 | 3/1993 | Kapany et al. | 385/11 X |
| 5,226,104 | 7/1993 | Unterleitner et al. | 385/18 X |

FOREIGN PATENT DOCUMENTS

| | | | |
|---|---|---|---|
| 0306604 | 3/1989 | European Pat. Off. | 385/18 X |
| 1-200317 | 8/1989 | Japan | 385/18 X |
| 2-131210 | 5/1990 | Japan | 385/18 X |

OTHER PUBLICATIONS

Shirasaki et al., "Bistable Magnetooptic Switch . . . " Applied Optics, vol. 21, No. 11 Jun. 1982 pp. 1943-1949.
Shirasaki et al., "Bistable Optical Switch . . . " Appl. Phys. Lett. vol. 38, No. 11 Jun. 1981 pp. 833-834.
Shirasaki et al., "Magnetooptical 2×2 switch . . . " Applied Optics, vol. 23, No. 19, Oct. 1984 pp. 3271-3276.
Shirasaki et al., "Nonmechanical Optical Switch . . . " Applied Optics, vol. 21, No. 23, Dec. 1982 pp. 4229-4234.

Primary Examiner—Brian Healy

[57] ABSTRACT

In an optical fibre system, an optical fibre is monitored to determine if a transmitted signal is being received at a receiving end. A bi-modal optical switch located between the laser transmitter and receiver operates in a first transmitting mode to allow a transmitted signal to pass through and in a second reflecting mode to reflect back the transmitted signal to the transmitting end. A monitor at the transmitting end monitors the fibre for the absence or presence of the reflected signal. The switch can be used to remotely monitor the receiver in an optical fibre link, to control handshaking between two computers, to remove idle sections from an optical fibre communications network, and to control the reflectance of a laser mirror.

9 Claims, 12 Drawing Sheets

POLARIZATION INDEPENDENT TRANSMISSIVE/REFLECTIVE OPTICAL SWITCH

FIELD OF THE INVENTION

This invention relates generally to optical switching circuits, and more particularly, to a switch for and switching system for providing reflection or transmission of an optical signal.

BACKGROUND OF THE INVENTION

In optical communication systems it is often required to switch optical signals from one optical fibre to another. A variety of optical switching circuits are known for performing this function. For example, U.S. Pat. No. 5,037,169 entitled High Speed Low Loss Optical Switch For Optical Communication Systems in the name of Chun, issued Aug. 6, 1991 discloses a Fabry-Perot etalon utilized as an optical switch for controllably switching an input optical signal on an input optical conduit between first and second output optical conduits.

Another optical switch for switching an input signal from one optical fibre to one of two other optical fibres is described by M. Shirasaki et al. in an article in Applied Optics entitled "Bistable Magnetooptic Switch for Multimode Optical Fiber", published Jun. 1, 1982 Vol. 21, No. 11. Shirasaki describes using a new type of Faraday rotator which utilizes the magnetooptic effect of a yttrium-iron-garnet (YIG) single crystal. The direction of rotation is controlled by inverting the direction in which the magnetic field is applied to the rotator. The optical path is determined by a polarization separator which functions as an optical switch.

As of late, many cable television companies are considering providing services to subscribers via one or more optical fibres instead of a co-axial cable currently used. Furthermore, these companies are considering adapting known optical switching circuits to allow them to monitor whether or not paying subscribers are using particular cable services provided to their homes via optical signals. Although known prior art circuits such as those mentioned above appear to perform their intended functions, there remains a need for a relatively efficient, simple transmissive/reflective switch that will perform the function of allowing a cable company to know when a subscriber is making use of provided services transmitted on an optical fibre. Such a switch would allow companies to monitor an optical fibre and charge their subscribers on a per use basis.

Furthermore, such a switch capable of being switched from a transmissive to a reflective mode, could be used in numerous other applications such as in the aeronautics industry and many others, as will be described later.

It is an object of the invention to provide a relatively inexpensive simple switch which will operate in either a transmitting mode or a reflecting mode.

SUMMARY OF THE INVENTION

In accordance with the invention there is provided, an optical switch having an input port and an output port comprising means for allowing an incoming optical signal propagating in a direction from the input port towards the output port to be directed to the output port or back to the input port.

In accordance with the invention there is further provided, an optical switch comprising an input port for connection to a first optical fibre; an output port for connection to a second optical fibre; and, means for allowing an incoming optical signal propagating along the first optical fibre and through the input port to be reflected back to the first optical fibre in a first mode of operation and for directing the incoming optical signal from the input port to the output port in a second mode of operation.

In accordance with yet another aspect of the invention, there is provided, a system for controlling the transmission of an optical signal from a first location, to and from a remote location, comprising means for providing an optical control signal; a first optical detector coupled to the means for providing a control signal; an optical switch located at the remote location, having an input port, an output port, and being responsive to the control signal, said optical switch having means for allowing an incoming optical signal transmitted from the first location and propagating in a direction from the input port towards the output port to be directed to the output port or back to the input port, said optical switch being responsive to a control signal provided by the first optical detector; and, a second optical detector coupled between the optical switch and the first location for receiving the optical signal after it has been directed back to the input port.

Advantageously, the switching can be performed by applying an optical signal, a voltage or a current to the switch, or alternatively, the switching action may be initiated remotely by sending an optical switching signal through the optical fibre; at the switch the switching signal can be converted to a voltage or current that activates the switch. The switch is connected to two optical fibres which can be either single-mode or multi-mode. Light from the input fibre is either reflected back through the same input fibre or transmitted to the output fibre. Switching may be adjusted continuously between full reflection and full transmission. Operation is independent of polarization and input and output ports are interchangeable. The switch differs from other optical switches in that switching is between transmission and reflection rather than between transmission and attenuation or transmission to different output ports.

In a preferred embodiment of the invention, the switch is designed to have low insertion loss, high isolation, polarization independent operation, wavelength and frequency insensitivity, reciprocity, low switching energy, and fast switching time.

Reciprocity of the switch is required when it is used in a bidirectional or full duplex transmission link, such as that required for interactive video. In this application, the switch must reflect signals from both input/output ports when it is in the reflective mode, and it must transmit signals from the first I/O port to the second I/O port to the second I/O port and vice versa when it is in the transmission mode.

BRIEF DESCRIPTION OF THE DRAWINGS

Exemplary embodiments of the invention will be described in conjunction with the drawings, in which.

DETAILED DESCRIPTION

Figure 1:
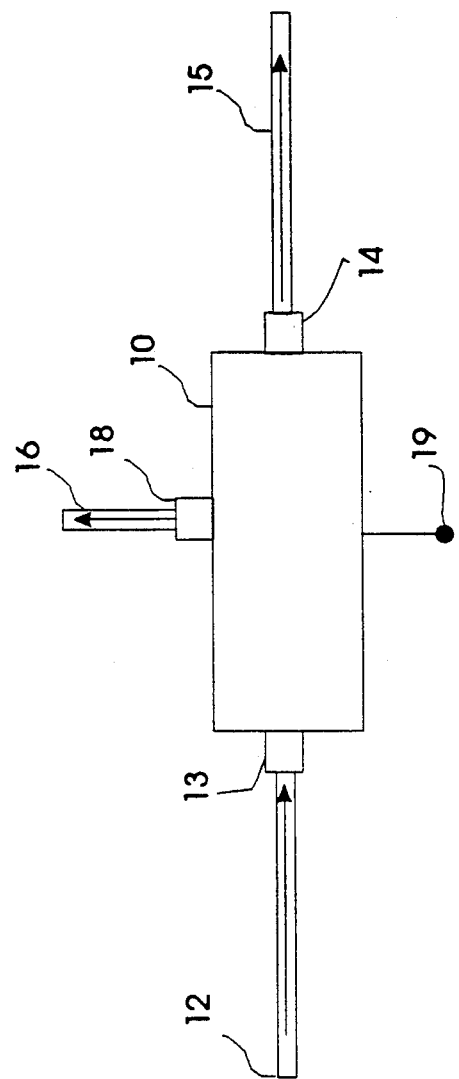
FIG. 1 is a circuit diagram of a prior art optical switch having an input port connected to an optical fibre and two output ports connected to two optical fibres.

Referring to FIG. 1, an optical switch 10 is shown having an input port 13 for coupling to an input optical fibre 12. Output ports 14 and 18 couple the switch to output optical fibres 15 and 16 respectively. The switch can be any of several types of optical switch. For example it can be of the type disclosed by Chun in U.S. Pat. No. 5,037,169 referred to above. The switch 10 operates in the following manner. When a control signal having a predetermined voltage is applied to a control terminal 19, the switch 10 operates in a first mode. In this mode, an input signal propagating along fibre 12 to the switch 10 is transmitted onto optical fibre 15 along a straight through path. Alternatively, when the voltage on the control signal is changed to another predetermined voltage level, the switch operates in a second mode; the input signal is routed from fibre 12 along a transverse path on optical fibre 16. In summary, the switch 10 routes an input signal from an input path to one of two output paths in dependence upon the voltage level of the control signal.

Figure 2:
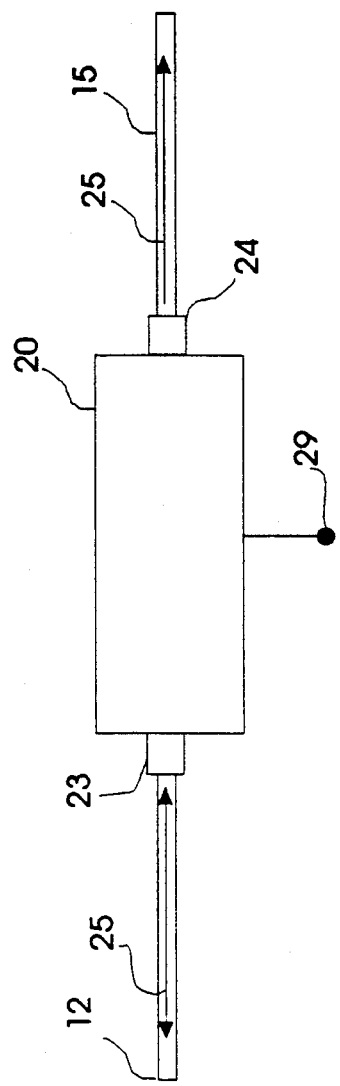
FIG. 2 is circuit diagram of an optical switch connected to an input and an output optical fibre, in accordance with the invention.

Referring now to FIG. 2, an optical switch 20 in accordance with the invention is shown having an input port 23 for coupling to an optical fibre 12. An output port 24 is provided for coupling the switch to an optical fibre 15. The switch 20 is capable of operating in two modes. In a first mode, an input signal 25 propagating along fibre 12 continues propagating through the switch and onto fibre 15. In a second mode of operation, the input signal 25 propagating along fibre 12 is reflected back along the same fibre 12. Means within the switch 20 provides this backward reflection. A voltage or current may be applied to a control terminal 19 so that the switch will toggle from one mode of operation to the other. The preferred embodiment of this invention is polarization independent; therefore the switching is not dependent upon the polarization of the signal light.

Of course, other means may be provided for controlling which mode the switch is in. For example, terminal 19 could be coupled to an optical receiving port having means responsive to an optical control signal. Alternatively, the input signal 25 propagating along input optical fibre 12, could be encoded with a specific data in the form of a key to control the state or mode of operation of the switch. In a preferred embodiment, the data is digitally encoded using non-overlapping codes for data and switch control. At the switch a fraction of the signal is continually tapped before the switch, converted to an electrical signal with a photodetector, and compared to one or two specific patterns stored in an electronic memory of the switch. When the portion of the signal containing the switching control is matched to the stored code, a detection circuit (not shown) sends a pulse to the switch.

The function of the switch 20 may be actualized by a variety of means and configurations as will be described.

Figure 3:
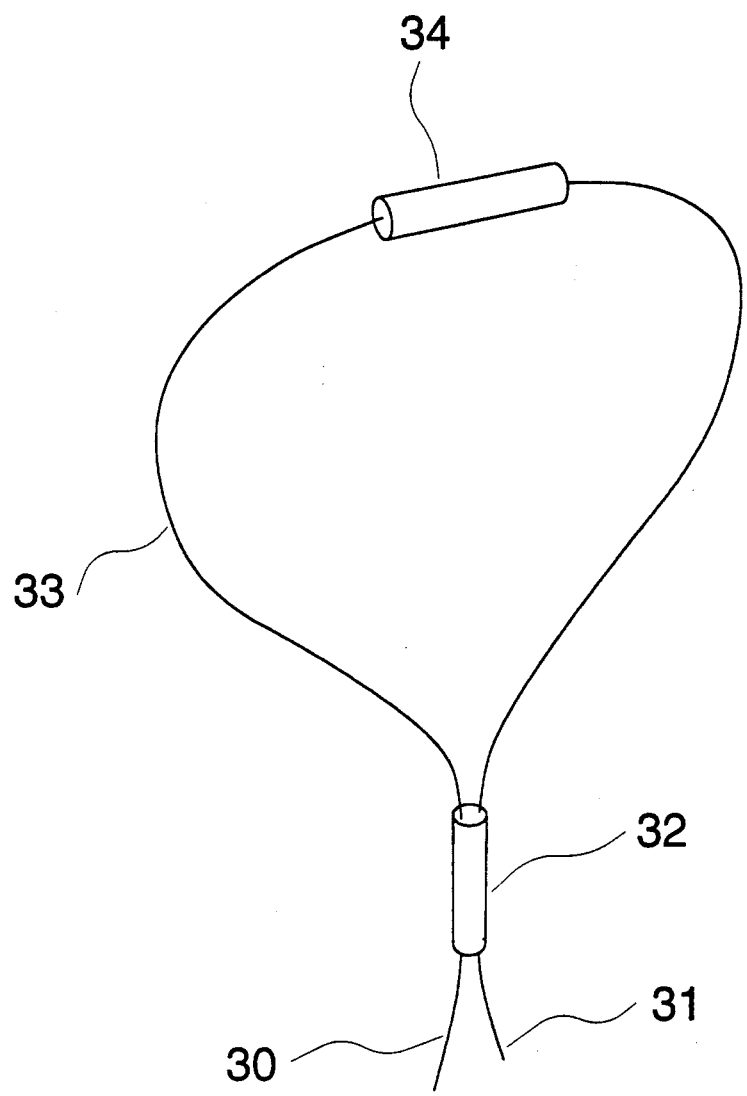
FIG. 3 is a circuit diagram of one embodiment of the switch of FIG. 2.

In a first embodiment, shown in FIG. 3, light from a first input/output fibre 30 is guided to a fibre polarizing beam splitter (PBS) 32, which separates the light into its two orthogonal components. These two orthogonal polarization components propagate in opposite directions around a loop of polarization maintaining fibre 33. The polarization of each orthogonal component of the light is rotated as the light propagates through a polarization rotating element 34. This polarization rotation can be accomplished with an electro-optic crystal such as lithium niobate, the degree of polarization rotation, being controlled by varying the voltage applied to the device. Alternatively, the polarization rotation may be provided by a Faraday rotating material such as yttrium-iron-garnet (YIG), the degree of polarization rotation being dependent upon the strength of an applied magnetic field.

In operation, the polarization rotation is switched between zero degrees in a transmitting mode and ninety degrees in a reflecting mode. After the two polarization components pass through the polarization rotating element 34 they are recombined at the PBS 32. If the polarization components are not rotated, the components are directed by the PBS 32 to the second input/output fibre 31. Similarly, light entering the second input/output port 31 is transmitted to the first input/output port 30 when the polarization components are not rotated. In the instance that the polarization is rotated by ninety degrees, light input to input/output port 30 is directed back to the input/output port 30 and the switch operates as a reflector. When the polarization is rotated by ninety degrees light input to input/output port 31 is directed back to the input/output port 31.

Figure 4:
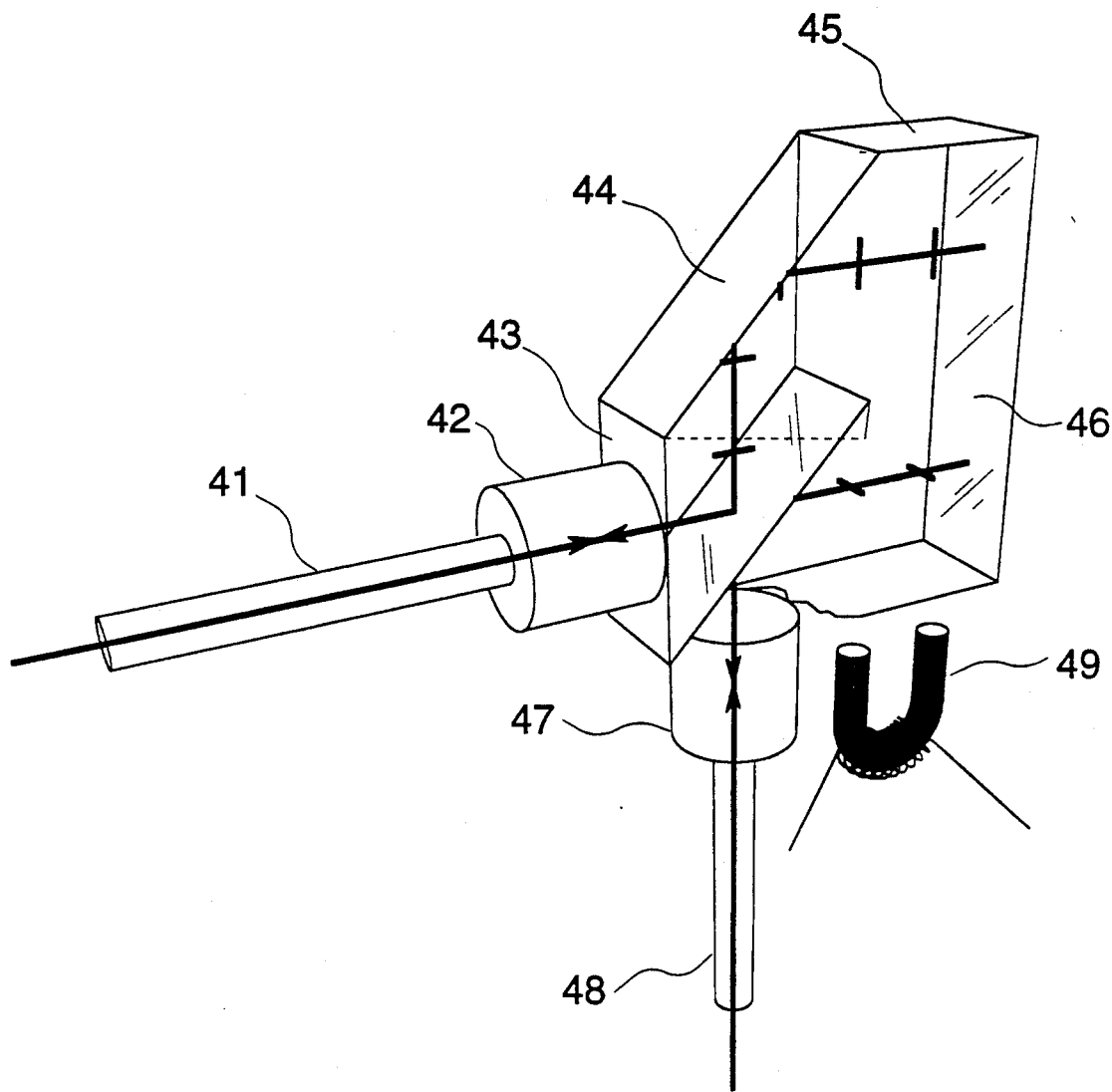
FIG. 4 is an oblique pictorial view illustrating an alternative embodiment of the switch shown in FIG. 3 using a magneto optic polarization rotator.

Referring to FIG. 4, an alternative embodiment of the switch is shown. First and second input/output optical fibers 41 and 48 are connected to GRIN lenses 42 and 47 respectively, for collimating and focusing light to and from the optical fibers. Both of these lenses are coupled to a polarization beam splitter 43 which is coupled to a prism 44. A Faraday rotating material 45 is coupled to the prism 44 and beam splitter 43 for rotating the polarization of light received from the beam splitter. An electromagnet 49 is positioned adjacent the material 45 for providing an magnetic field. A reflecting surface 46 is provided at an end face of the material 45 which serves as a mirror.

In operation, the switch of FIG. 4 works in the following manner. In a first transmitting mode light from optical fiber 41 is collimated by GRIN lens 42 and is separated into a first and a second polarization component by the polarization beam splitter 43. The beam splitter 43 transmits the first component and reflects the second component towards the prism 44. The prism 44 directs the second component so that it becomes parallel to the first component. The two now parallel components then pass through the Faraday rotating material 45 and are reflected backwards through the material 45 by the reflecting surface 46. The magnetic field generated by the magnet 49 is set so that the polarization of the two components are each rotated by 45 degrees on each pass through the material 45 thereby yielding a total polarization rotation of 90 degrees. After rotation, the first component is reflected by beam splitter 43 towards the GRIN lens 47 while the second component is directed by the prism 44 to the beam splitter passing therethrough towards the GRIN lens 47. These two components follow the same path through the GRIN lens 47 which focuses them into the optical fiber 48.

In a second reflecting mode light input to optical fiber 41 is directed back onto itself after passing through the switch. As in the first transmitting mode the light is separated into its two components and is directed by the beam splitter to the Faraday rotating material 45. Essentially light follows the same path as described above, however, the polarization is not rotated and the light is directed by the beam splitter back to the input fiber 41 instead of to the optical fiber 48.

When operating in the transmitting mode, light input from optical fiber 48 is directed to optical fiber 41 and when operating in the reflecting mode light input from optical fiber 48 is directed back to optical fiber 48.

Switching between reflecting and transmitting mode is performed by applying a current to the electromagnet 49. It is preferable to use a semi-hard magnetic material such as Nibcolloy ™. The magnetization can be reversed by applying a current pulse and the magnetization remains after the pulse has been removed. Such a material is advantageous since it does not require additional energy to maintain the magnetization.

The switch described in FIG. 4, may be enhanced by the addition of two birefringent plates (not shown). These plates improve the polarization separation and can be located between the GRIN lenses and the polarization beam splitter.

Figure 5:
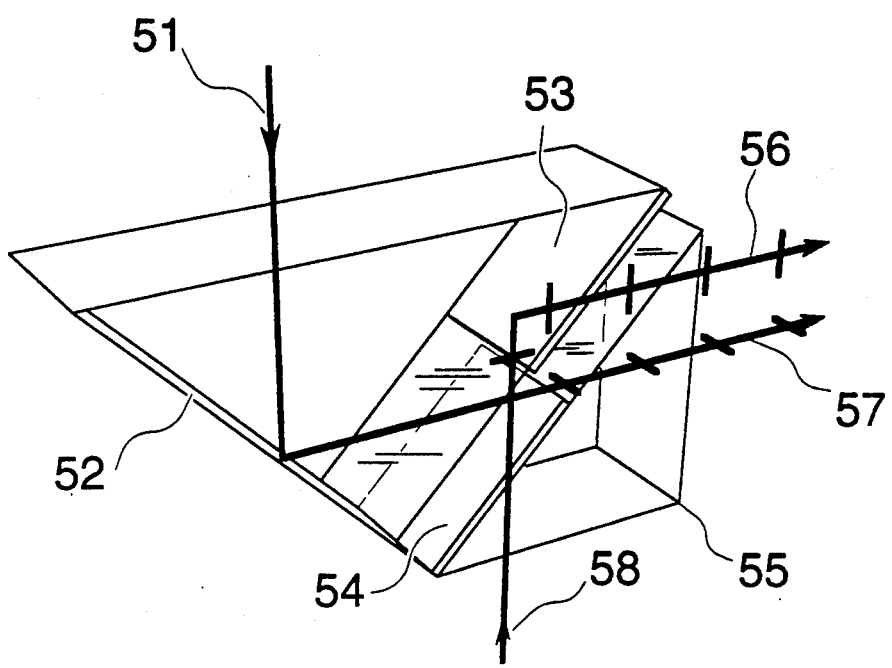
FIG. 5 is an oblique view of an alternative embodiment of the polarization separation section of the switch shown in FIG. 4.

Alternatively, the function of the polarization beam splitter and prism arrangement shown in FIG. 4 can be performed by the circuit of FIG. 5 which includes a polarization separation film 54 and a total reflection film 53 sandwiched between two prisms 52 and 55. In operation, this configuration separates an input beam 51 into its two orthogonal components 56 and 57. Light input from the another direction indicated by arrow 58, is also separated into its two components (not shown) thereby performing the same function as the polarization beam splitter and prism combination shown in FIG. 4.

Figure 6:
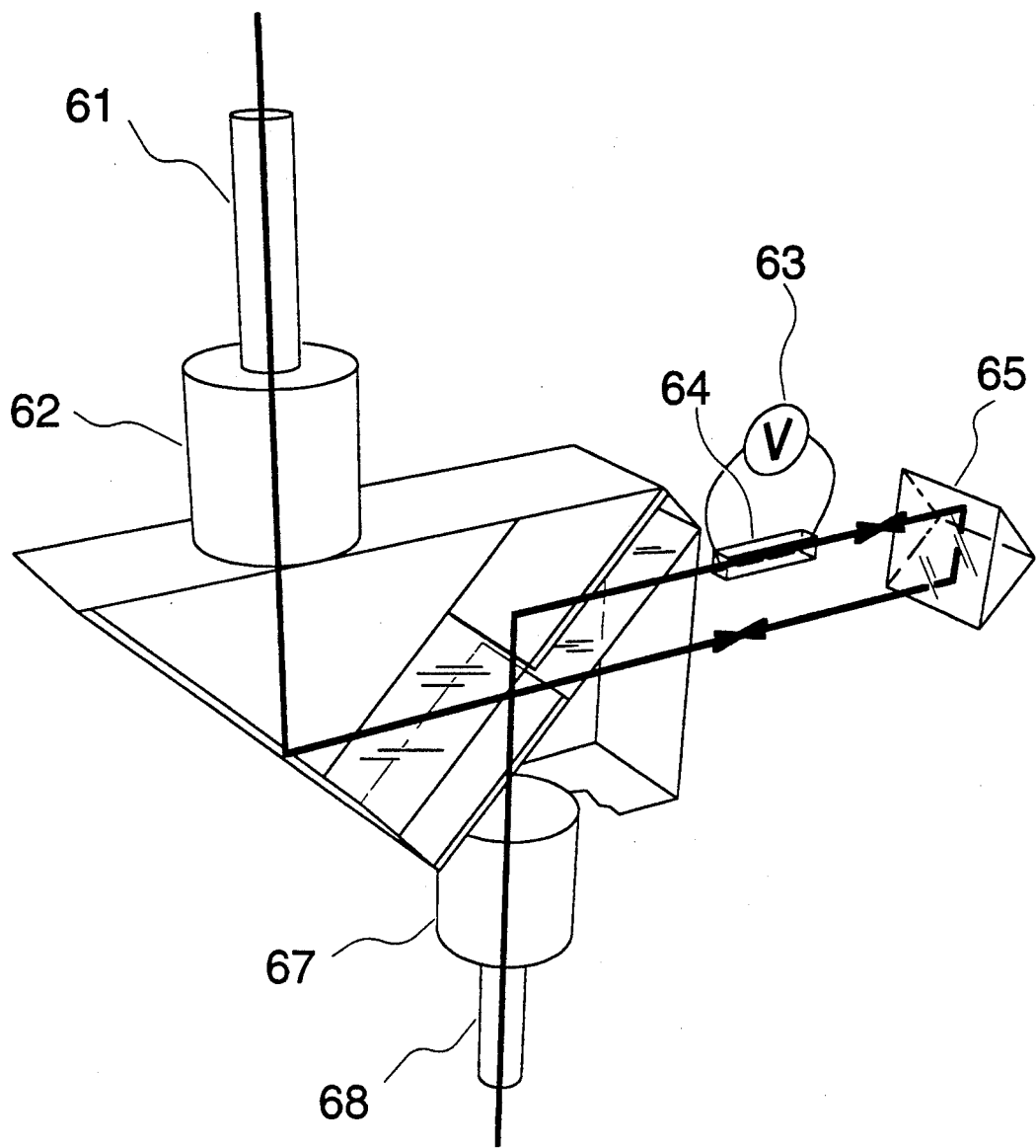
FIG. 6 is an oblique pictorial view of an alternative embodiment of the switch shown in FIG. 4 using an electro-optic polarization rotator with the arrangement shown in FIG. 5.

FIG. 6 shows an alternative embodiment of the optical switch of FIG. 4. The circuit operates in basically the same manner as that of FIG. 4; the polarization separation and recombination is achieved with the arrangement of FIG. 4 and polarization rotation is performed by an electro-optic crystal 64 with each polarization component passing once through the crystal 64. A prism 65 directs the two polarization components in opposite directions through the crystal 64: the degree of polarization rotation is directly proportional to the voltage 63 applied to the crystal. Of course, other means of polarization rotation may also be used such as passing the light through a twisted nematic liquid crystal with an applied voltage or using magnetic linear birefringence (also known as the Coton-Mouton or Voigt effect). When the light returns to the polarization separating/combining section it is recombined and focused into one of the input and output fibers 61 and 68. The voltage applied to the electro-optic crystal 64 is adjusted so that the net polarization rotation is either zero or ninety degrees. When the polarization rotation is zero degrees, light entering the switch from fibre 61 is transmitted to fibre 68 and light entering from fibre 68 is transmitted to fibre 61. When the polarization rotation is ninety degrees, light entering the switch from fibre 61 is reflected back to fibre 61 and light entering from fibre 68 is reflected back to fibre 68.

Many different types of optical modulators, switches and other devices have been fabricated in optical waveguides materials such as lithium niobate. Optical waveguide devices have numerous advantages; they are compatible with guided wave optics; they are compact; they have low magnetic field requirements, and they can be mass produced at a relatively low cost.

Figure 7:
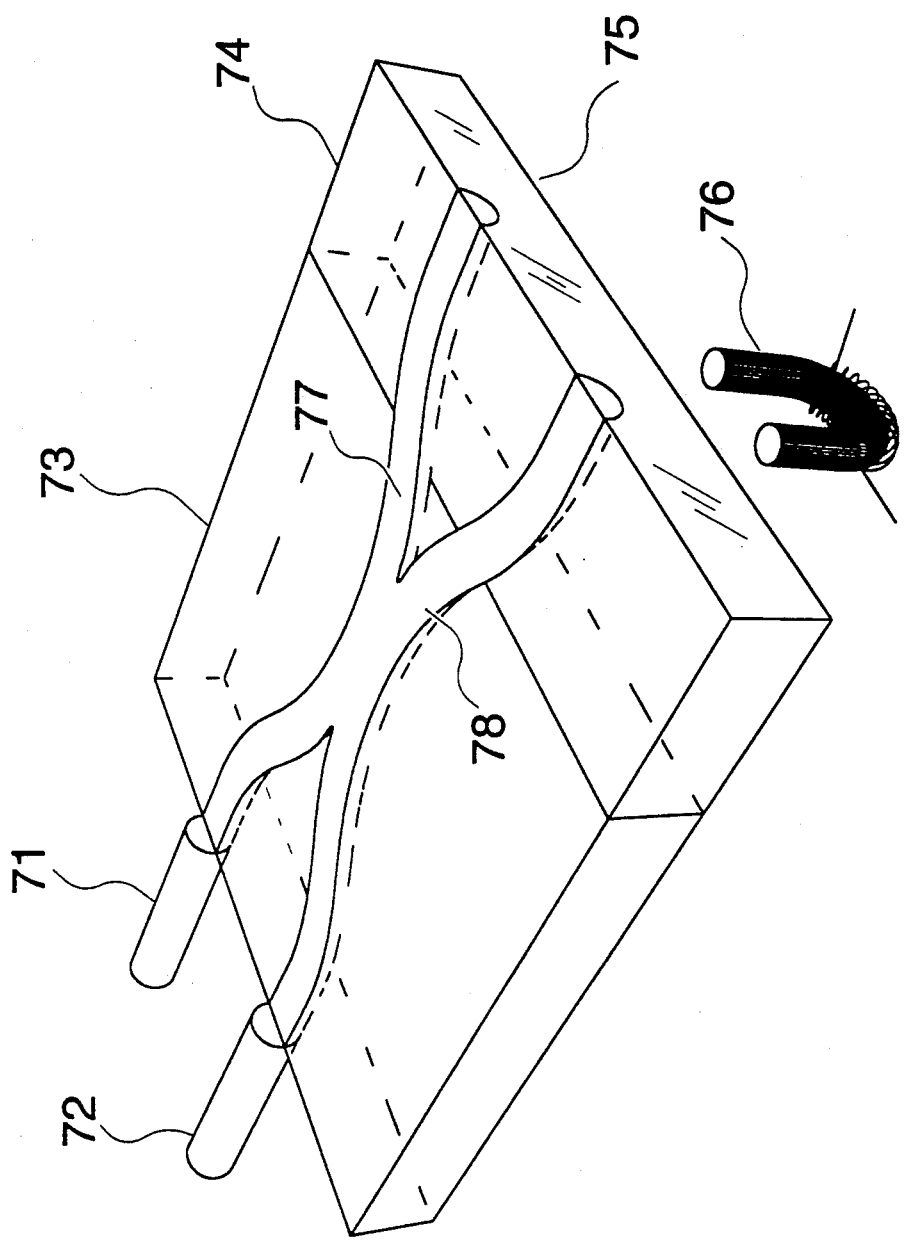
FIG. 7 is an oblique view of the optical switch fabricated with integrated optical channel waveguides.

FIG. 7 shows yet another embodiment of an optical switch in accordance with this invention. Though this embodiment is fabricated with integrated optical channel waveguides, it is similar in some respects to the switch described in FIG. 4. It is coupled to two input/output optical fibres 71 and 72. The first section 73 consists of a polarization beam splitter which may be made, for example, with lithium niobate. This separates the light from either input/output fibre into its two orthogonal polarization components which are guided by the two branches 77 and 78. The second section consists of a thin film, 45 degree Faraday rotator, which can be made, for example, with (Bi, Ga) YIG. The degree of polarization rotation in the Faraday rotation material is controlled by the current in the electromagnet 76. The mirror can be attached to the end of the Faraday rotating section 74; or, a dielectric or metallic mirror can be directly coated to the Faraday rotating section 74. By changing the current applied to the electromagnet, the total polarization rotation in the double pass through the Faraday rotating material can be switched between zero and ninety degrees. When the polarization rotation is zero degrees, light entering the switch from fibre 71 is transmitted to fibre 72 and light entering from fibre 72, is transmitted to fibre 71. When the polarization rotation is ninety degrees, light entering the switch from fibre 71 is reflected back to fibre 71 and light entering from fibre 72 is reflected back to fibre 72.

The switch described in the various embodiments may be used as a building block in combination with a variety of other circuit components arranged in a plurality of circuit topologies. For example, the switch in accordance with this invention, may be used to provide a transmitting end with required information relating to the state of a device at a destination end, reflected back from the destination end. On aircraft, it can be preferred to send optical signals from one location to another, instead of electrical signals which can spark an explosion when proximate to highly combustive aircraft fuel. In some locations on aircraft, it is desired for a remote location of the craft to send, back to the cockpit control panel, information such as whether a door is open or closed. However, there is often difficulty supplying power to these remote locations to power a switch. Recently, electro-optic converters which yield as much as 0.6 A/W with a 0.8 micron wavelength and 10.0 A/W with a 1.5 micron wavelength have become commercially available. These converters allow for relatively efficient optical-to-electrical conversion, and when used with diode lasers and optical fibers it is possible to deliver from milliwatts up to a watt of electrical power with 10% efficiencies.

Figure 8:
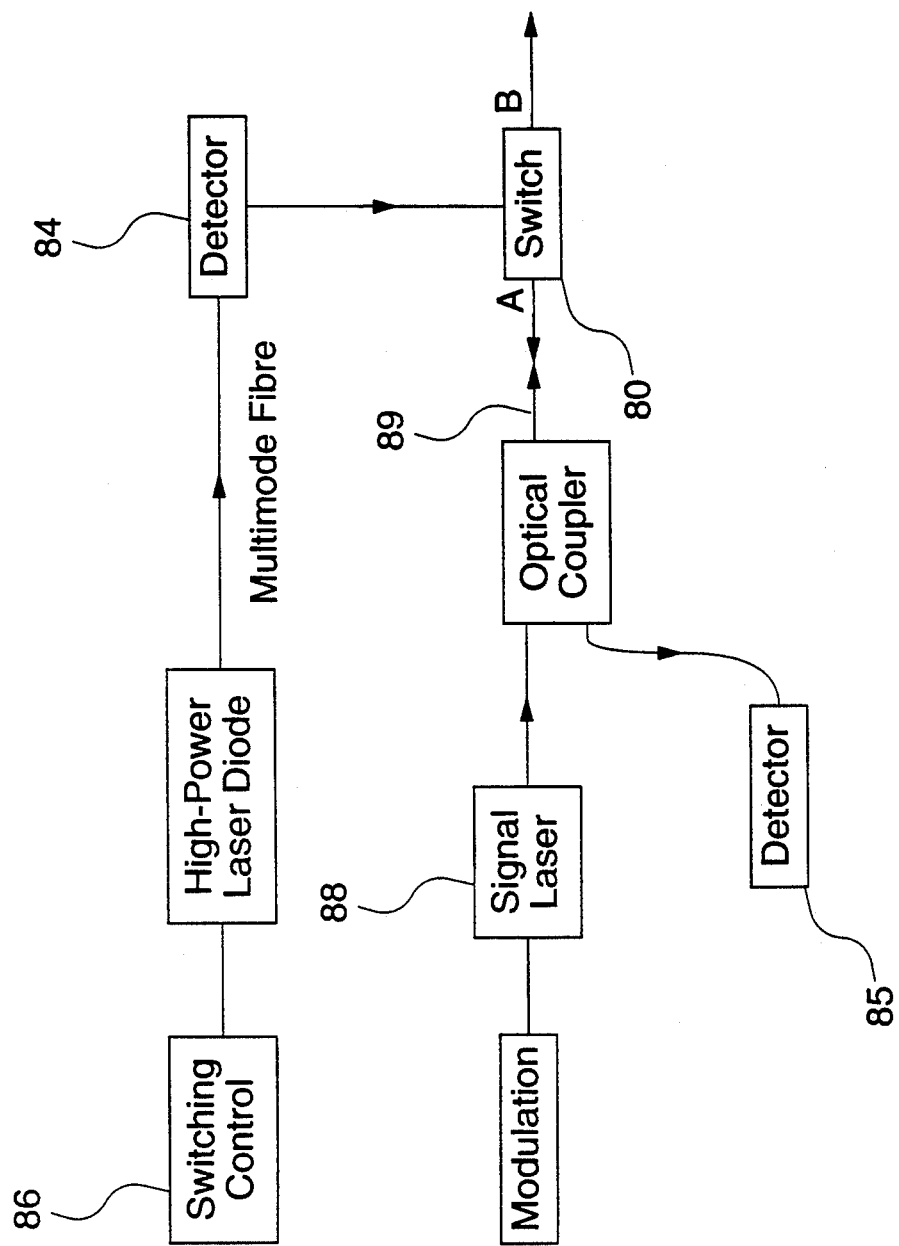
FIG. 8 is a block circuit diagram of a system for remotely controlling the optical switch shown in FIG. 1.

Referring to FIG. 8, a first system configuration is shown based on the use of the switch described in the various embodiments above. The system essentially comprises a multimode fiber 82 connected to a bi-stable switch 80 via an electro-optic converter 84 that functions as a remote detector. A high power diode laser 86 serves as a source to provide a high-power signal to the switch 80 via the multimode fiber 82. A low power signal laser 88 is coupled to a single mode fiber 89 that is connected to a port "A" of the switch.

The system shown in FIG. 8 operates in the following manner. The low power signal laser 88 transmits a signal along the single mode fiber to the "A" side of the switch. When the bi-stable sswitch is set in a transmitting mode, the transmitted signal propagates through the switch 80 to "B" side, and onward. However, when the switch is in a reflecting mode, the signal transmitted by the low power signal laser 88 is prevented from reaching the "B" side and is reflected back by the switch 80 to the signal laser end. A signal pulse generated by the high-power laser 86 propagates along the multimode fiber and is converted into an electrical pulse by an optical detector 84. Each time the bi-stable switch receives an electrical pulse from the detector 84, the switch toggles from the transmitting mode to the reflecting mode or vice versa. A detector 85 coupled to the single mode fiber 89 via an optical coupler receives and detects the reflected signal from the "A" side when the switch 80 is in the reflecting mode.

Figure 9:
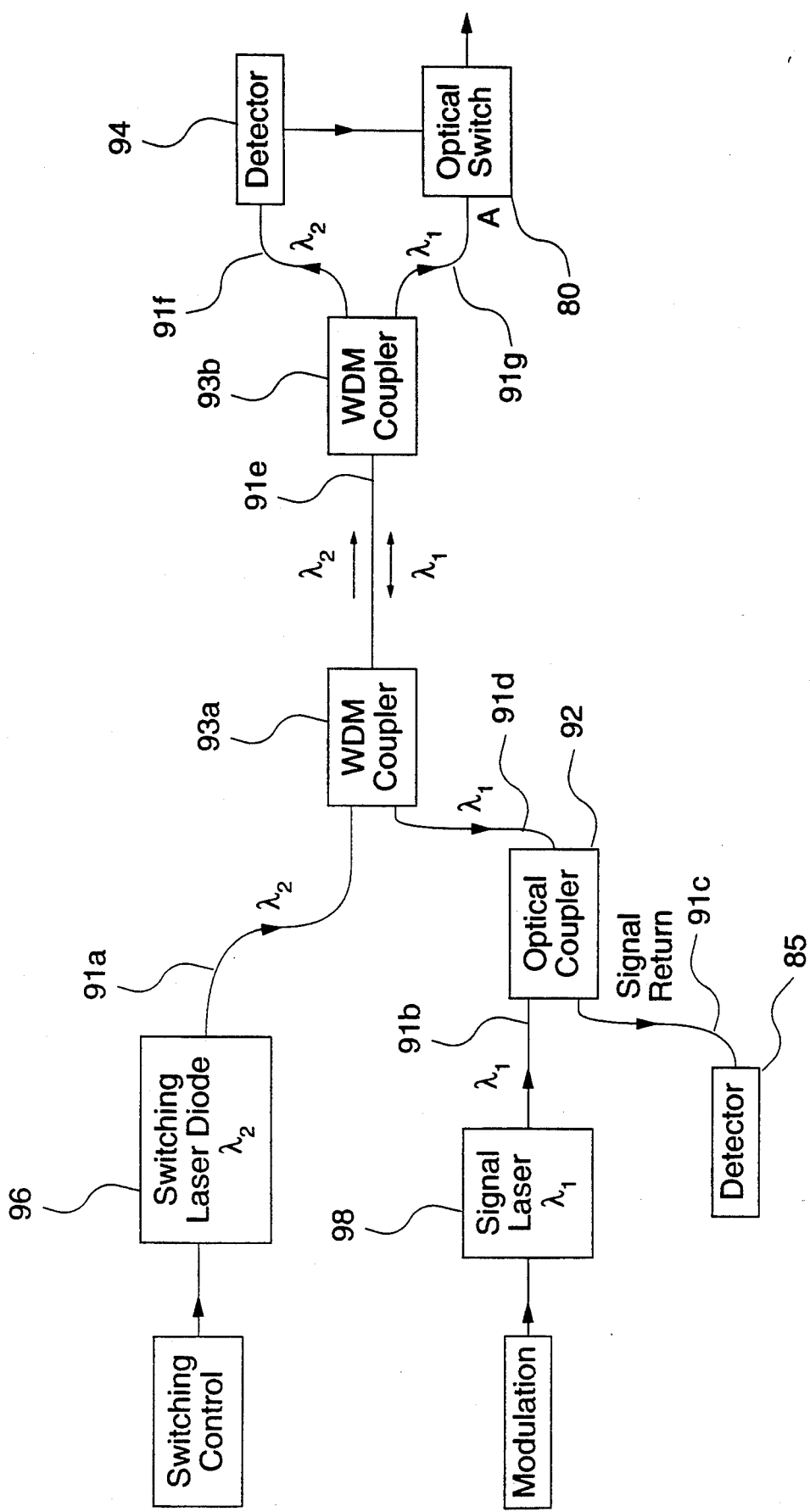
FIG. 9 is a block circuit diagram of an alternative embodiment of a system using wavelength division multiplexing for remotely controlling the optical switch.

Referring to FIG. 9, an alternative embodiment of the configuration of FIG. 8 is shown for achieving the same end. Preferably, all of the optical fibers 91a to 91g shown are of the single mode type. In FIG. 9 switching control of an optical switch 80 is provided by a switching laser diode 96 transmitting a control signal at a wavelength of $\lambda_2$. A signal laser 98 transmits a data signal having a frequency of $\lambda_1$ toward the optical switch 90 via an optical coupler 92 and a first and second wavelength division multiplexor (WDM) 93a and 93b respectively. A optical detector 85 is coupled to the WDM 93a via an optical coupler that receives and detects a reflected signal from the switch 80 when it is in the reflecting mode. WDM 93b provides the required coupling such that the control signal of wavelength $\lambda_2$ is routed to the detector 94 and the data signal of wavelength $\lambda_1$ is routed to the A side of the optical switch 80. WDM 93a provides the required coupling so that a returning reflected signal of wavelength $\lambda_1$ is routed to the optical detector 85. When a switching pulse is received by the detector 94 it produces a voltage or current pulse to toggle the switch.

Figure 10:
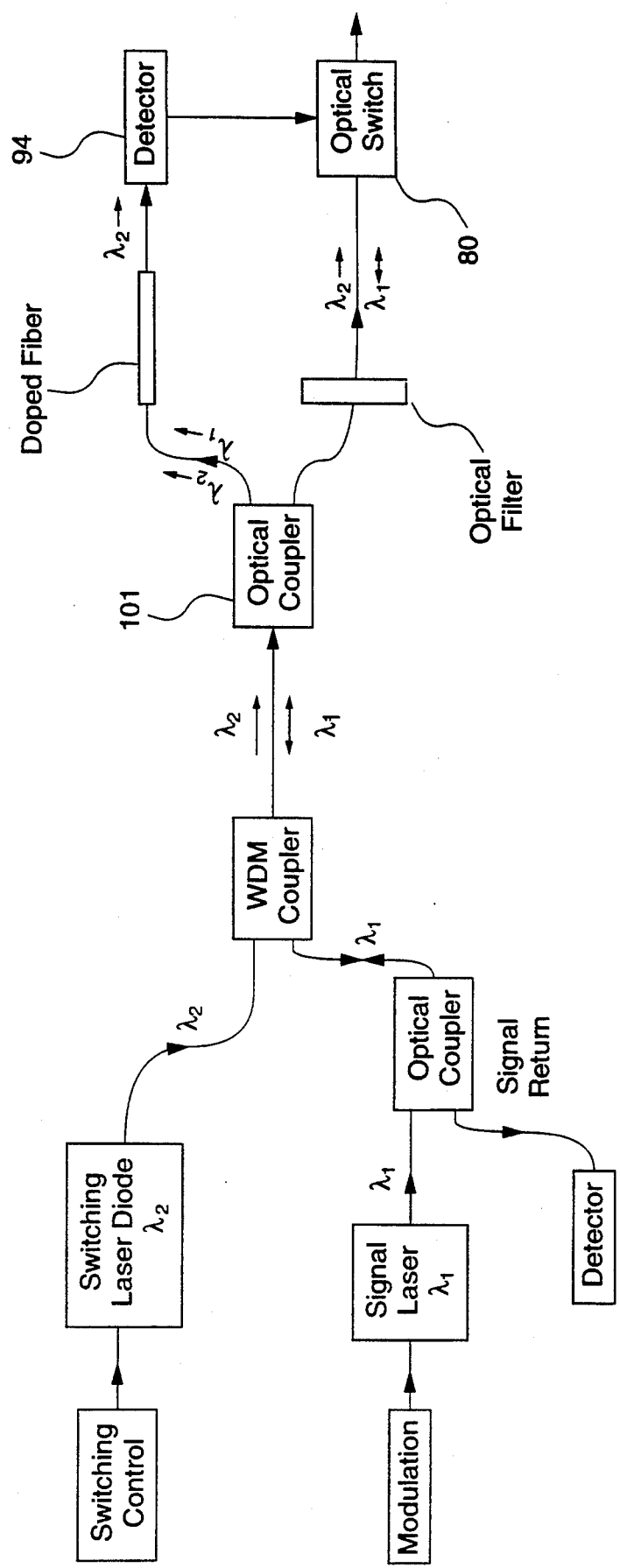
FIG. 10 is a block circuit diagram of an alternative embodiment of a system using wavelength selective doped optical fiber for remotely controlling the optical switch.

Many of the components and much of the circuit topology in FIG. 9 are shown in FIG. 10; as well, both circuits operate in much the same manner. However in FIG. 10, an optical coupler 101 is provided in place of the WDM coupler 93b shown in FIG. 9. In FIG. 10 a doped optical fiber, for example an erbium doped fiber, provides a transmission path between the coupler 101 and the detector 94. Since erbium attenuates particular wavelengths, for example $\lambda_1$, and transmits other wavelengths such as $\lambda_2$, the control signal is transmitted to the detector while the data signal is substantially prevented from reaching the detector. On the other branch comprised of a single mode fiber, a filter may optionally be included in series between the optical coupler 101 and the switch 80, to prevent the control signal of wavelength $\lambda_2$ from reaching the optical switch 80.

In the three embodiments shown in FIGS. 8, 9, and 10, the optical switch 80 is controlled by a switching control laser. Alternatively, in a more complicated arrangement not shown, an encoded data signal having an imbedded control sequence, could be decoded and used to control the switch 80.

Figure 11:
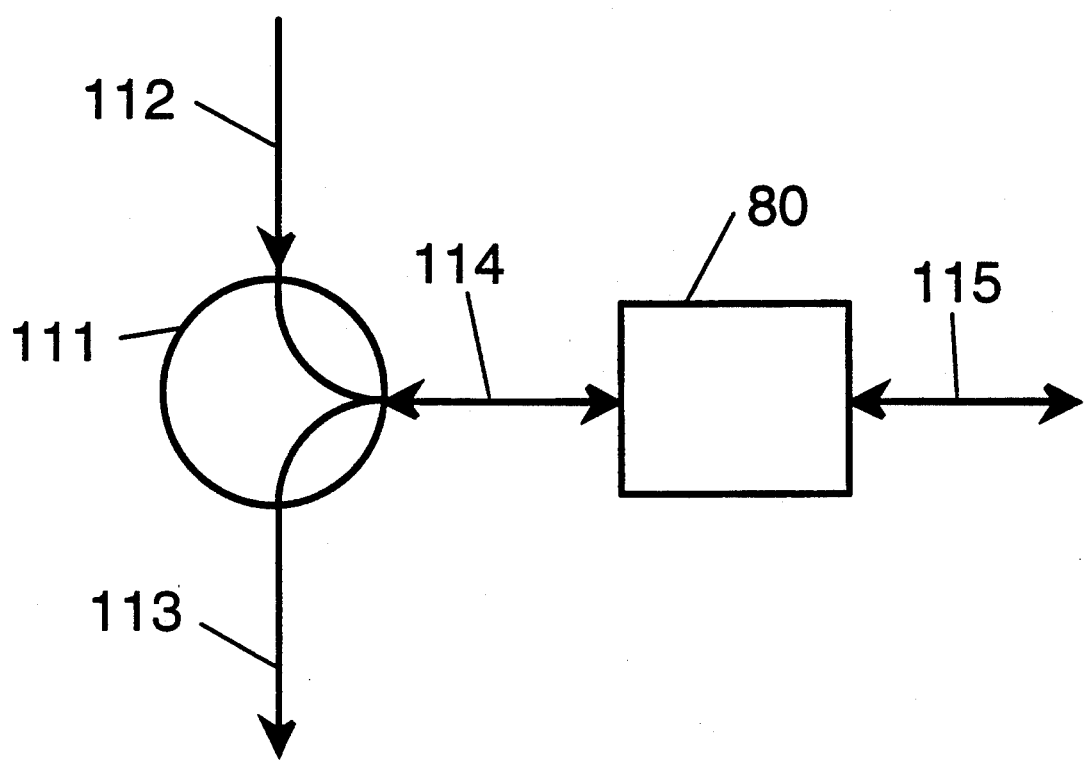
FIG. 11 is a block circuit diagram of an optical circulator connected to the optical switch; and, FIG. 12 is an oblique view of a switch in accordance with the invention including modulating means.

FIG. 11 illustrates a use of the optical switch 80 in a optical fibre communications network. An optical circulator is a commercially available device that is used to add and remove signals from optical fibre communication networks. In the three port circulator shown, light entering the first port is transmitted to the second port, light entering the second port is transmitted to the third port, and light entering the third port is attenuated. The optical circulator is used for unidirectional networks often used in a ring or bus architecture. An optical circulator 111 is used at a network node to direct signals in optical fibre 112 to optical fibre 114 and to direct signals from optical fibre 114 to optical fibre 113. The optical switch is located between fibres 114 and 115. When the switch 80 is in a transmitting mode, signals from fibre 112 are transmitted to fibre 115 and signals from fibre 115 are transmitted to fibre 113. And, when the switch is in the reflecting mode, signals from fibre 112 are transmitted directly to fibre 113. Thus the switch can remove or add the section of the network connected to fibre 115 to the network section connected to fibres 112 and 113.

Figure 12:
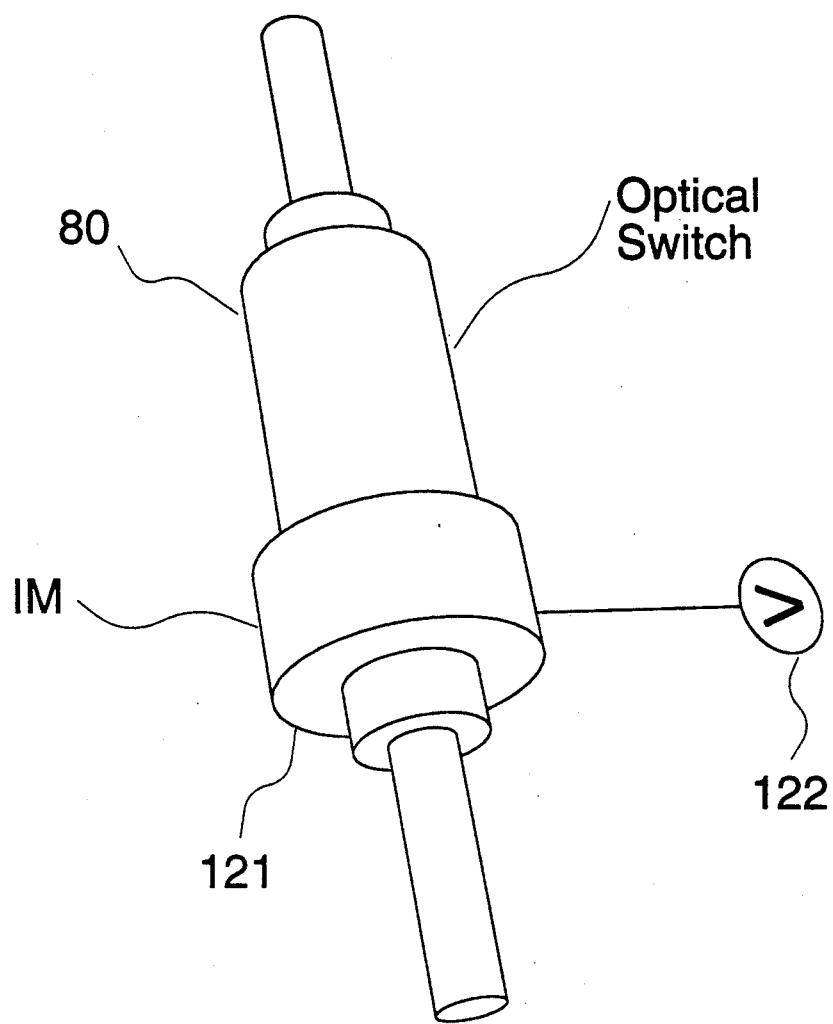

As described in the background of the invention, many cable television companies are considering providing services to subscribers via one or more optical fibres instead of a co-axial cable currently used; Hence there is a need for a relatively efficient, simple transmissive/reflective switch that will perform the function of allowing a cable company to know when a subscriber is making use of provided services transmitted on optical fibre. Now, referring to FIG. 12, such a device is shown, having the added capability of bi-directional communications. The device comprises an optical reflective/transmissive switch 80, of one of the types shown in the embodiments explained. The device also includes an intensity modulator 122 for modulating a slow signal with the faster, returning data signal along the return path in the reflective mode of operation. The modulator 122 could be of the liquid crystal type used in digital watches. The liquid crystal used, would only have to be able to function in the millisecond or microsecond range which would allow for digital code or voice transmission from subscriber to a cable company for instance. Such an embodiment would also allow analog low speed signal transmission, for example, for receiving information about analog sensor information status in a remote location.

In summary, a transmissive/reflective switch of the type described heretofore, in detail, has numerous applications and uses. In an all optical network using a ring or bus topology, the switch described in accordance with this invention coupled with a optical circulator can remove idle or dedicated stations from the network, without reducing signal power levels. When a network node is inactive it sets the switch to reflective mode. Light entering the node is thus reflected back into the network and transmitted to the next node without significant attenuation. This is especially useful in large networks where the availability of sufficient optical power limits the number of nodes of the network.

Of course, numerous other embodiments may be envisaged without departing from the spirit and scope of the invention.

We claim:

1. An optical switch comprising: an input port for connection to a first optical fibre, an output port for connection to a second optical fibre, and, means for allowing an incoming optical signal propagating along the first optical fibre and through the input port to be reflected back to the first optical fibre in a first mode of operation and for directing the incoming optical signal from the input port to the output port in a second mode of operation, wherein the means for allowing in incoming optical signal to be reflected back comprises:

first means for separating the optical signal propagating in a first direction into two polarization components;

second means for rotating the separated polarization components; and, third means for directing the separated components of the optical signal in a predetermined direction to one of the input port and the output port.

2. An optical switch as defined in claim 1, further comprising means coupled to the optical switch for modulating the incoming optical signal and for providing a modulated returning signal to be directed from the output port back to the input port.

3. An optical switch as defined in claim 1 wherein the first means for separation of the optical signal into two polarization components comprises a polarization beam splitter;

4. An optical switch as defined in claim 3 wherein the second means for rotating comprises one of a magneto-optic polarization rotator, an electro-optic rotator and an acousto-optic rotator.

5. An optical switch as defined in claim 4 wherein the third means comprises a reflection means for reflecting the separated polarization components to one of the ports.

6. A system for controlling the transmission of an optical signal from a first location, to and from a remote location, comprising:

means for providing an optical control signal;

a first optical detector coupled to the means for providing a control signal;

an optical switch located at the remote location, having an input port, an output port, and being responsive to the control signal, said optical switch having means for allowing an incoming optical signal transmitted from the first location and propagating in a direction from the input port towards the output port to be directed to the output port or back to the input port, said optical switch being responsive to a control signal provided by the first optical detector; and, a second optical detector coupled between the optical switch and the first location for receiving the optical signal after it has been directed back to the input port.

7. A system for controlling the transmission of an optical signal as defined in claim 6 further comprising, means coupled to the optical switch for modulating the incoming optical signal and for providing a modulated returning signal to be directed from the output port back toward the input port to be received by the second optical detector.

8. A system as defined in claim 7 further comprising demodulating means coupled to the second optical detector.

9. In a system having an optical switch including an input port, an output port, and means for allowing an incoming optical signal propagating in a direction from the input port towards the output port to be directed to the output port or back to the input port, at a remote location and having optical waveguide means for guiding the incoming optical signal from a first location to the input port, a method of remotely determining if the incoming optical signal is present at the output port comprising the steps of:

launching the incoming signal in a direction from the input port towards the output port; and, monitoring the waveguide to determine if the transmitted signal is being reflected back along the waveguide the reflected transmitted signal being a polarized signal, from the first input port towards the first location, the detection of a reflected transmitted signal corresponding to a condition where the incoming optical signal is absent at the output port, the absence of a reflected back transmitted signal corresponding to a condition where the incoming optical signal is present at the output port.

* * * * *